(12) United States Patent
Zhang et al.

(10) Patent No.: US 11,228,197 B2
(45) Date of Patent: Jan. 18, 2022

(54) ENERGY CONVERSION SYSTEM AND METHOD BY PHASE TRANSFORMING MATERIALS

(71) Applicant: The Hong Kong University of Science and Technology, Hong Kong (CN)

(72) Inventors: Chenbo Zhang, Hong Kong (CN); Xian Chen, Hong Kong (CN)

(73) Assignee: The Hong Kong University of Science and Technology, Hong Kong (CN)

(*) Notice: Subject to any disclaimer, the term of this patent is extended or adjusted under 35 U.S.C. 154(b) by 127 days.

(21) Appl. No.: 16/832,522

(22) Filed: Mar. 27, 2020

(65) Prior Publication Data
US 2020/0335997 A1    Oct. 22, 2020

Related U.S. Application Data

(60) Provisional application No. 62/920,172, filed on Apr. 17, 2019.

(51) Int. Cl.
*H02J 7/00* (2006.01)
*H02J 7/34* (2006.01)
*H01G 7/04* (2006.01)

(52) U.S. Cl.
CPC ......... *H02J 7/007194* (2020.01); *H01G 7/04* (2013.01); *H02J 7/345* (2013.01)

(58) Field of Classification Search
CPC .............................................. H02J 7/007194
(Continued)

(56) References Cited

U.S. PATENT DOCUMENTS 4,425,540 A    1/1984    Olsen
4,647,836 A    3/1987    Olsen
(Continued)

FOREIGN PATENT DOCUMENTS

CN    1032721 A    5/1989

OTHER PUBLICATIONS

Firth, Anton, Bo Zhang, and Aidong Yang. "Quantification of global waste heat and its environmental effects." Applied energy 235 (2019): 1314-1334.
(Continued)

*Primary Examiner* — Yalkew Fantu
(74) *Attorney, Agent, or Firm* — S&F/WEHRW

(57) ABSTRACT

The present disclosure provides an energy conversion system and method for generating electricity directly from heat by phase transformation of ferroelectric materials without any external power sources. The energy conversion system includes an electric circuit comprising a phase-changing capacitor and a charge reservoir. The phase-changing capacitor has a dielectric layer comprising a phase-transforming ferroelectric material. When the phase-changing capacitor is initialized and subjected to thermal cycles through a transformation temperature of the phase-transforming ferroelectric material, the polarization of the dielectric layer undergoes an abrupt change between a ferroelectric phase and a paraelectric phase such that a current flow between the phase-changing capacitor and the charge reservoir via a load thereby converting heat into electrical energy. The present energy conversion method does not require any external bias fields during the energy conversion.

20 Claims, 15 Drawing Sheets

(58) Field of Classification Search
USPC .......................................................... 320/166
See application file for complete search history.

(56) References Cited

U.S. PATENT DOCUMENTS

| | | | | |
|---|---|---|---|---|
| 8,035,274 | B2* | 10/2011 | Erbil | H01L 37/02 |
| | | | | 310/306 |
| 8,410,760 | B2* | 4/2013 | Formanski | H01M 10/443 |
| | | | | 320/150 |
| 8,519,595 | B2 | 8/2013 | Hunter et al. | |
| 9,653,673 | B1* | 5/2017 | Dea | F03B 17/00 |
| 2003/0090238 | A1* | 5/2003 | Wolin | H02J 7/0091 |
| | | | | 320/150 |
| 2017/0241650 | A1* | 8/2017 | Richardson | F24D 19/1066 |

OTHER PUBLICATIONS

Orr, Franklin M. "2015 Quadrennial Technology Review." Proceedings of the International Conference for High Performance Computing, Networking, Storage and Analysis. ACM, 2015.

Champier, Daniel. "Thermoelectric generators: A review of applications." Energy Conversion and Management 140 (2017): 167-181.

Liu, Jian, et al. "Giant magnetocaloric effect driven by structural transitions." Nature materials 11.7 (2012): 620.

Srivastava, Vijay, et al. "The direct conversion of heat to electricity using multiferroic alloys." Advanced Energy Materials 1.1 (2011): 97-104.

Vopson, Melvin M. "Fundamentals of multiferroic materials and their possible applications." Critical Reviews in Solid State and Materials Sciences 40.4 (2015): 223-250.

Moya, Xavier, et al. "Giant electrocaloric strength in single-crystal BaTiO3." Advanced materials 25.9 (2013): 1360-1365.

Olsen, Randall B., David A. Bruno, and J. Merv Briscoe. "Pyroelectric conversion cycles." Journal of applied physics 58.12 (1985): 4709-4716.

Clingman, W. H., and R. G. Moore Jr. "Application of ferroelectricity to energy conversion processes." Journal of Applied Physics 32.4 (1961): 675-681.

Bowen, Chris R., et al. "Pyroelectric materials and devices for energy harvesting applications." Energy & Environmental Science 7.12 (2014): 3836-3856.

Childress, J. D. "Application of a ferroelectric material in an energy conversion device." Journal of Applied Physics 33.5 (1962): 1793-1798.

Olsen, Randall B. "Ferroelectric conversion of heat to electrical EnergyA demonstration." Journal of Energy 6.2 (1982): 91-95.

Lang, Sidney B. "Pyroelectricity: from ancient curiosity to modern imaging tool." Physics today 58.8 (2005): 31.

First Office Action with Search Report of CN202010241413.4 issued by the China National Intellectual Property Administration (CNIPA) of the PRC dated Mar. 29, 2021.

* cited by examiner

ENERGY CONVERSION SYSTEM AND METHOD BY PHASE TRANSFORMING MATERIALS

CROSS-REFERENCE TO RELATED APPLICATIONS

This application claims the benefit of U.S. Provisional Patent Application No. 62/920,172, filed on Apr. 17, 2019, which is incorporated by reference herein in its entirety.

TECHNICAL FIELD

The present disclosure relates to an energy conversion system and method by phase-transforming materials.

BACKGROUND

Recycling and harvesting energy from waste heat is one of the most urgent challenges in energy science and technology. The generation of waste heat is unavoidable from fuel burn, running computers and machines, transportation and even the power generation process itself. In recent years, waste heat emission has reached about 30% of the global input energy annually. While people work on minimizing the waste heat emission, making use of it and converting it back to useful energy plays an important role in reducing waste heat and enhancing the renewable power generation. Thermoelectric devices with state-of-the-art designs are the most mature technology for this purpose, but their performance is highly hindered at low temperature regime, especially at the temperature lower than 200° C.

Materials undergoing first-order phase transformation accompanied by a sudden change in ferroelectric properties have attracted attention in recent years for energy conversion via low-grade wasted heat. An example of such materials is $BaTiO_3$ (barium titanate) that structurally transforms from tetragonal to cubic upon heating together with abrupt change of polarization before and after the phase transformation. Many conventional energy conversion designs using such materials for electricity generation are based on Olsen cycles. However, all these designs use an external DC voltage/power source to provide a bias electric field on the transforming material during the isobaric thermodynamic process. However, an appropriate design for electricity generation should not depend on another voltage source.

Accordingly, energy conversion via phase-changing ferroelectric materials has been widely studied in many energy conversion systems. Temperature dependent polarization/capacitance is usually understood as the pyroelectric effect in conventional designs. The materials used in these systems are ferroelectric materials. These materials can be made into dielectric layers so that they become temperature dependent capacitors. These pyroelectric energy conversion designs include the external voltage source for providing the bias field during isobaric process in the Ericssion cycle. The electricity collected on the resistor is frequently confused with the electrostatic energy converted from heat. However, these two quantities are not necessarily equal. As a result, care should be taken when evaluating electricity collected on the resistor thought to be generated by ferroelectric materials. When external voltage source is connected, it will be impossible to distinguish the electrostatic energy generated from the phase transformation and the bias field of the external battery.

A need therefore exists for a new energy conversion system by phase transformation in ferroelectric materials that eliminates or at least diminishes the disadvantages and problems described above.

SUMMARY

Provided herein is a system for converting heat into electrical energy, the system having an initialization mode and an energy conversion mode and comprising an electrical circuit, the electrical circuit comprising: a phase-changing capacitor having one or more dielectric layers, each dielectric layer comprising a phase-transforming ferroelectric material such that each phase-changing capacitor has a temperature-dependent capacitance switching from a first capacitance value to a second capacitance value when a temperature of the phase-changing capacitor switches from a first temperature below a phase-transforming temperature of the phase-transforming ferroelectric material to a second temperature above the phase-transforming temperature and vice versa; a charge reservoir for releasing and receiving charge; and a switching network configured to: when the system is in the initialization mode, connect an external power source to the electrical circuit for initializing phase-changing capacitor and the charge reservoir to store charge; and when the system is in the energy conversion mode after the phase-changing capacitor and the charge reservoir are initialized and the external power source is disconnected from the electric circuit, connect a load between the phase-changing capacitor and the charge reservoir such that when the phase-changing capacitor is subjected to one or more thermal cycles and the temperature of the phase-changing capacitor oscillates between the first temperature and the second temperature, a current flows to and fro between the phase-changing capacitor and the charge reservoir through the load, thereby converting heat from the one or more thermal cycles into electrical energy to drive the load.

In certain embodiments, the system further comprises the external power source for initializing the phase-changing capacitor and the charge reservoir when the system is in the initialization mode.

In certain embodiments, the system further comprises the load connecting to the electrical circuit when the system is in the energy conversion mode.

In certain embodiments, the system further comprises a temperature-varying device for assisting in generation of the one or more thermal cycles.

In certain embodiments, the phase-transforming ferroelectric material has a ferroelectric phase and a paraelectric phase, the ferroelectric phase providing the first capacitance value, the paraelectric phase providing the second capacitance value.

In certain embodiments, the first capacitance value is higher than the second capacitance value, the first capacitance value being between 1 nF and 1 F, the second capacitance value being between 0.1 pF and 1 mF.

In certain embodiments, the phase transformation temperature is between 0° C. and 250° C.

In certain embodiments, the phase-transforming ferroelectric material is barium titanate, lead zirconate titanate, or polyvinylidene fluoride.

In certain embodiments, the phase-transforming ferroelectric material is a doped barium titanate having a chemical formula of $Ca_vBa_wCe_xZr_yTi_zO_3$, where v is between 0 and 0.5, w is between 0.5 and 1, x is between 0 and 0.25, y is between 0 and 0.25, and z is between 0.5 and 1.

In certain embodiments, the phase-changing capacitor is formed by connecting plural component phase-changing capacitors in parallel, the one or more dielectric layers being distributed in the component phase-changing capacitors.

In certain embodiments, the phase-changing capacitor is formed by connecting plural component phase-changing capacitors in series, the one or more dielectric layers being distributed in the component phase-changing capacitors.

In certain embodiments, the charge reservoir is a reference capacitor or a Leyden jar.

In certain embodiments, the reference capacitor has a reference capacitance value between 1 nF and 1 F.

In certain embodiments, the switching network further comprises one or more switches configured to: connect the external power source to the electrical circuit when the system is in the initialization mode; and connect the load to the electrical circuit when the system is in the energy conversion mode.

In certain embodiments, the electrical circuit further comprises a rectifier connecting to the phase-changing capacitor and the charge reservoir through the switching network for rectifying the current from an alternating current signal to a direct current signal.

Provided herein is a method for converting heat into electrical energy comprising: providing the system described above, the system being in the energy conversion mode such that the phase-changing capacitor and the charge reservoir are initialized and the load being connected to the electric circuit; and subjecting the phase-changing capacitor to one or more thermal cycles such that when the temperature of the phase-changing capacitor oscillates between the first temperature and the second temperature, the current flows to and fro between the phase-changing capacitor and the charge reservoir through the load, thereby converting heat from the one or more thermal cycles into electrical energy to drive the load.

In certain embodiments, the phase-changing capacitor and the charge reservoir are initialized by steps of: connecting the external power source to the electrical circuit when the system is in the initialization mode; initializing the phase-changing capacitor and the charge reservoir to store charge; and disconnecting the external power source from the electrical circuit thereby providing the system in the energy conversion mode.

In certain embodiments, each of the one or more thermal cycles has a frequency between 0.001 Hz to 1000 Hz.

Provided herein is a system for converting heat into electrical energy, the system comprising an electrical circuit, the electrical circuit comprising: a phase-changing capacitor having one or more dielectric layers, each dielectric layer comprising a phase-transforming ferroelectric material such that each phase-changing capacitor has a temperature-dependent capacitance switching from a first capacitance value to a second capacitance value when a temperature of the phase-changing capacitor switches from a first temperature below a phase-transforming temperature of the phase-transforming ferroelectric material to a second temperature above the phase-transforming temperature and vice versa; a charge reservoir for releasing and receiving charge; and a network configured to connect a load between the phase-changing capacitor and the charge reservoir such that after the phase-changing capacitor and the charge reservoir are initialized to store charge, and when the phase-changing capacitor is subjected to one or more thermal cycles and the temperature of the phase-changing capacitor oscillates between the first temperature and the second temperature, a current flows to and fro between the phase-changing capacitor and the charge reservoir through the load, thereby converting heat from the one or more thermal cycles into electrical energy to drive the load.

In certain embodiments, the phase-changing capacitor and the charge reservoir are initialized by an inductive charging or a wireless charging.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects of the present invention are disclosed as illustrated by the embodiments hereinafter.

BRIEF DESCRIPTION OF DRAWINGS

The appended drawings, where like reference numerals refer to identical or functionally similar elements, contain figures of certain embodiments to further illustrate and clarify the above and other aspects, advantages and features of the present invention. It will be appreciated that these drawings depict embodiments of the invention and are not intended to limit its scope. The invention will be described and explained with additional specificity and detail through the use of the accompanying drawings in which.

Figure 1:
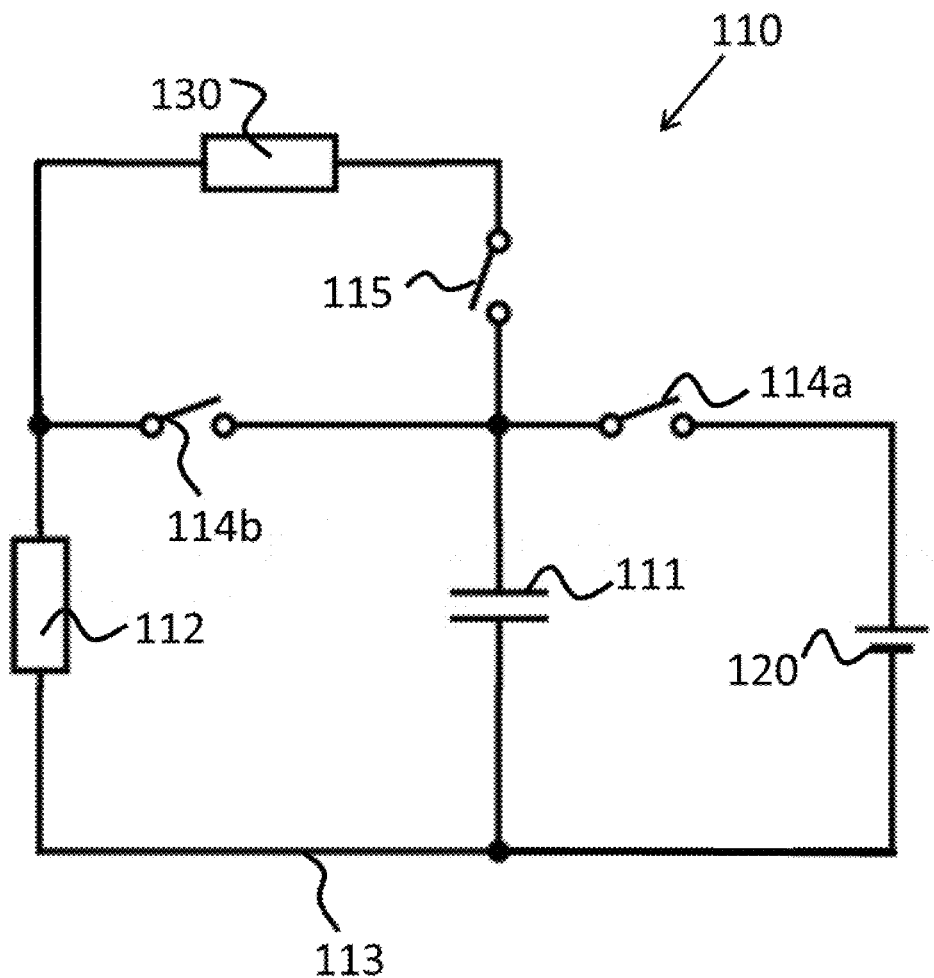
FIG. 1 is a schematic drawing depicting a system for converting heat into electrical energy according to certain embodiments.

Skilled artisans will appreciate that elements in the figures are illustrated for simplicity and clarity and have not necessarily been depicted to scale.

DETAILED DESCRIPTION OF THE INVENTION

It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

The present disclosure provides an energy conversion system and method by phase-transforming ferroelectric materials. The energy conversion method is free of any external power sources during an energy conversion mode and the phase-transforming ferroelectric material used in this method acts as a pump that compresses electric current into a connected circuit during phase transformation. The present method is a direct technique to convert heat to electrical energy, which is generated by moving electric charges in the present system.

The present energy conversion system converts energy from heat into electricity by first-order phase transformation without any connections to an external power source. The system comprises a phase-changing capacitor and a charge reservoir, and operates under periodically varying temperature field, which may also be applied in a temperature gradient environment by additional temperature-varying devices. During the thermally driven phase transformation in ferroelectric materials, the temperature-dependent capacitance of the phase-changing capacitor alters due to the switching of the polarization states in dielectric layers, thus, the charges held by the phase-changing capacitor flow into the circuit. Being different from conventional methods, the present energy conversion system does not require an external power source, which ensures that the obtained energy on the load is fully from the phase transformation of the ferroelectric materials rather than manipulation on the external power source.

The system includes one or more phase-changing capacitors made of phase-transforming ferroelectric materials. The phase-transforming ferroelectric materials can be barium titanate, lead zirconate titanate, polyvinylidene fluoride. These materials have phase transformation under heating and cooling so that the capacitance of these phase-changing capacitors is temperature dependent. Under heating and cooling conditions, the changing capacitance generates charge movement in the system. The charge movement involves the entry and exit from one or more charge reservoirs. One example of the charge reservoir is a reference capacitor, which can be a normal capacitor with assigned capacitance, e.g., 1 µF, 1 mF, etc. The form of charge reservoir can be varied. The charge reservoir and the phase-changing capacitor are connected together and initialized by an external power source at certain temperature. The ferroelectric material in phase-changing capacitor can be polarized under the electric field provided by the external power source, which sets a starting point for energy conversion. The process is called initialization. The initial electric field and temperature as used can be determined by polarization behavior of the ferroelectric materials. After the initialization, the external power source is removed. The detachment of the external power source results in a specific amount of charges stored in the system. And the total amount of charges in the system can be calculated by the total capacitance of the phase-changing capacitor and reference capacitor at initial temperature and voltage/electric field conditions. As a result, the present method converting heat to electricity is external power source free. Large electricity generation can be achieved by series-connected or parallel-connected multi-capacitors.

FIG. 1 is schematic diagram depicting a system for converting heat into electrical energy according to certain embodiments. The system has an initialization mode and an energy conversion mode and comprises an electrical circuit 110. The electrical circuit 110 comprises a phase-changing capacitor 111, a charge reservoir 112 and a switching network 113. The charge reservoir 112 releases and receives charges. The phase-changing capacitor 111 has a dielectric layer comprising a phase-transforming ferroelectric material such that the phase-changing capacitor 111 has a temperature-dependent capacitance switching from a higher capacitance value to a lower capacitance value when a temperature of the phase-changing capacitor switches from a first temperature below a phase-transforming temperature of the phase-transforming ferroelectric material to a second temperature above the phase-transforming temperature and vice versa. The switching network 113 consists of electrical connectors (e.g., electrical wires) and three electrical switches 114a, 114b, 115. In the initialization mode, the electrical switch 114a, 114b are closed such that the phase-changing capacitor 111 and the charge reservoir 112 are connected together in parallel and the electrical circuit 110 is connected to an external power source 120 to initialize the phase-changing capacitor 111 and the charge reservoir 112 to store charge. The initialization is to make the phase-changing capacitor 111 polarized at given electric field. Higher electric field leads to higher polarization in material and higher capacitance in the phase-changing capacitor 111. The upper bound of voltage/electric field provided by the external power source 120 is to make the phase-changing capacitor saturated. Then, the electrical switches 114a, 114b are opened such that the external power source 120 is disconnected from the electric circuit 110. In the energy conversion mode, the electrical switch 115 is closed such that a load 130 is connected between the phase-changing capacitor 111 and the charge reservoir 112. When the phase-changing capacitor 111 is subjected to thermal cycles and the temperature of the phase-changing capacitor 111 oscillates between the first temperature and the second temperature, charge flows out from the phase-changing capacitor 111 under heating while charge flows into the phase-changing capacitor 111 under cooling such that a current flows to and fro between the phase-changing capacitor 111 and the charge reservoir 112 through the load 130, thereby converting heat from the thermal cycles into electrical energy to drive the load 130.

In certain embodiments, the system further comprises an external power source for initializing the phase-changing capacitor and the charge reservoir when the system is in the initialization mode.

In certain embodiments, the system further comprises a load being connected between the phase-changing capacitor and the charge reservoir when the system is in the energy conversion mode.

In certain embodiments, the system further comprises a temperature-varying device for assisting generation of the thermal cycles applying to the phase-changing capacitor.

In certain embodiments, the phase-transforming ferroelectric material has a ferroelectric phase and a paraelectric phase, the phase-transforming ferroelectric material in the ferroelectric phase provides a higher capacitance value to the phase-changing capacitor, and the phase-transforming ferroelectric material in the paraelectric phase provides a lower capacitance value the phase-changing capacitor.

In certain embodiments, the higher capacitance value is between 1 nF and 1 F, and the lower capacitance value is between 0.1 pF and 1 mF.

In certain embodiments, the phase transformation temperature is between 0° C. and 250° C.

In certain embodiments, the phase-transforming ferroelectric material is barium titanate, lead zirconate titanate, or polyvinylidene fluoride.

In certain embodiments, the phase-transforming ferroelectric material is a doped barium titanate doped with calcium, cerium and/or zirconium.

In certain embodiments, the phase-transforming ferroelectric material is a doped barium titanate having a chemical formula of $Ca_vBa_wCe_xZr_yTi_zO_3$, where v is between 0 and 0.5, w is between 0.5 and 1, x is between 0 and 0.25, y is between 0 and 0.25, and z is between 0.5 and 1.

In certain embodiments, the phase-changing capacitor is formed by connecting plural component phase-changing capacitors in parallel. The number of the plural component phase-changing capacitors can be between 2 and 100.

In certain embodiments, the phase-changing capacitor is formed by connecting plural component phase-changing capacitors in series. The number of the plural component phase-changing capacitors can be between 2 and 100.

In certain embodiments, the charge reservoir is a reference capacitor or a Leyden jar.

In certain embodiments, the reference capacitor has a reference capacitance value between 1 nF and 1 F.

In certain embodiments, the switching network further comprises one or more switches configured to: connect an external power source to the electrical circuit when the system is in the initialization mode; and connect a load to the electrical circuit when the system is in the energy conversion mode. The switch can be a mechanical switch, an electrical switch, or an electronic switch.

In certain embodiments, the electrical circuit further comprises a rectifier connecting the switching network for rectifying the current from an alternating current to a direct current.

In certain embodiments, the external power source is an external voltage source or an external current source. The external voltage source can be an external DC voltage source.

In certain embodiments, the external power source generates a voltage between 1 mV and 100 V.

In certain embodiments, the load is an electronic device, an optical device, a resistor, a sensor, an inductor, a light emitting diode, an electrical energy storage device, or a rechargeable battery.

In certain embodiments, the temperature-varying device is a rotating fan with blades for generating temperature variation from environment that has temperature gradient. The system in the energy conversion mode is installed on one end of the blade. When the fan is rotating, the position of the blade is changed such that the temperature of the system is also changed. Then, a high-low temperature cycle is achieved such that the system can generate electricity.

In certain embodiments, the temperature-varying device is a heat conducting fin attached on a heat source, e.g., an engine of a car. When the engine is running, the temperature fluctuation exists in cylinders of the engine. The heat conducting fin can conduct the heat from the cylinders to the system in the energy conversion mode such that the system generates electricity.

Figure 2:
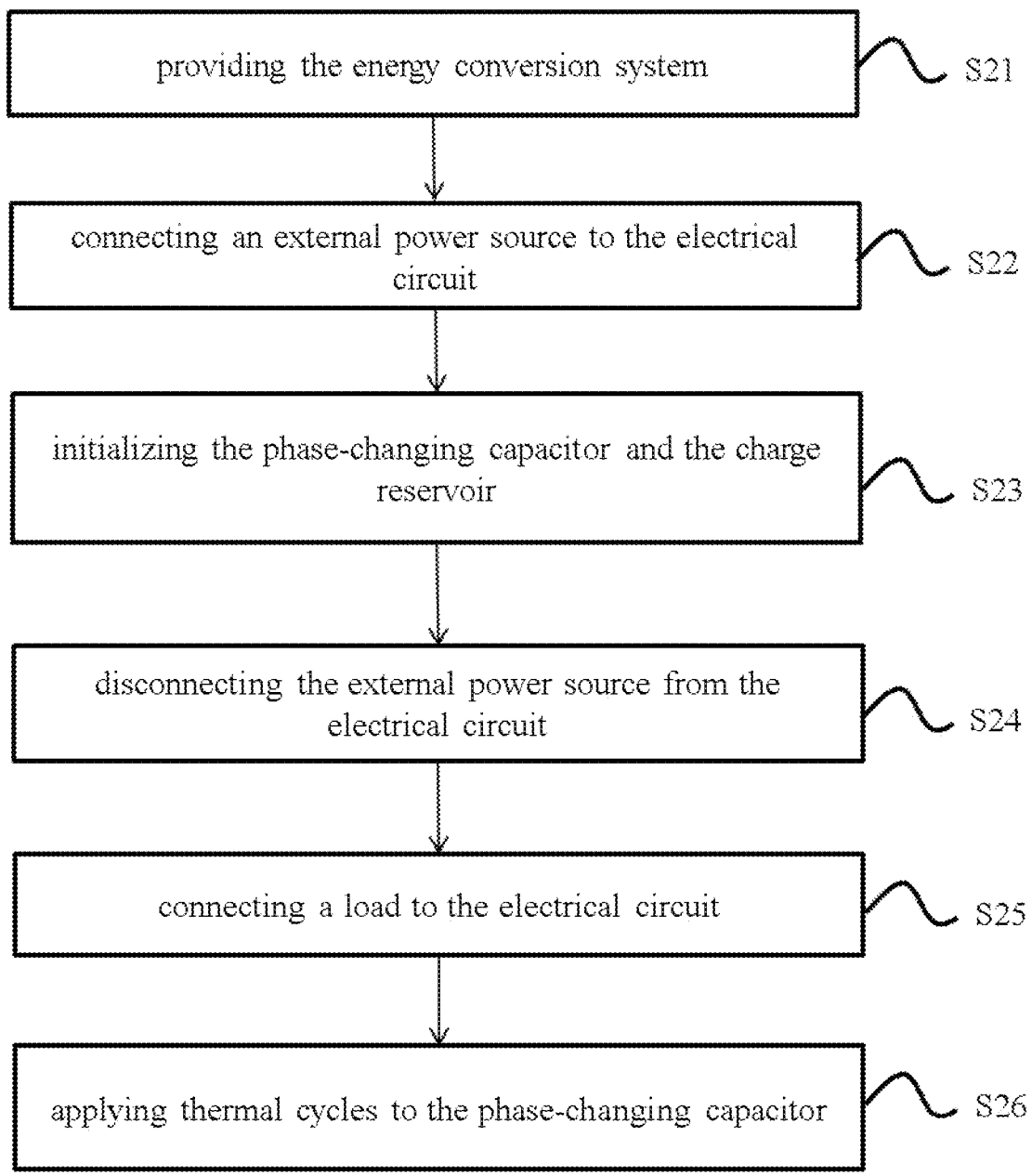
FIG. 2 is a flow chart depicting a method for converting heat into electrical energy according to certain embodiments.

FIG. 2 is a flow chart depicting a method for converting heat into electrical energy according to certain embodiments. In step S21, the energy conversion system described above is provided. In step S22, an external power source is connected to the electrical circuit of the system. In step S23, the phase-changing capacitor and the charge reservoir are initialized by the external power source to store charge. In step S24, the external power source is disconnected from the electrical circuit. In step S25, a load is connected to the electrical circuit between the phase-changing capacitor and the charge reservoir. In step S26, thermal cycles are applied to the phase-changing capacitor such that a current flows to and fro between the phase-changing capacitor and the charge reservoir for converting heat from the thermal cycles into electrical energy to drive the load.

In certain embodiments, the thermal cycles are generated from waste heat coming from fuel burn, a computer, a machine, or a power generator.

In certain embodiments, each thermal cycle oscillates between 0° C. and 250° C.

In certain embodiments, each thermal cycle has a frequency between 0.001 Hz to 1000 Hz.

In certain embodiments, each thermal cycle has a triangular pattern, rectangular pattern, square pattern, or sinusoidal pattern.

The thermodynamic cycle in the present energy conversion method can not only be described from either a polarization-electric field relation or polarization-temperature relation in a phase-transforming ferroelectric material, but also a charge-voltage relation and charge-temperature relation in phase-changing capacitors.

Figure 3:
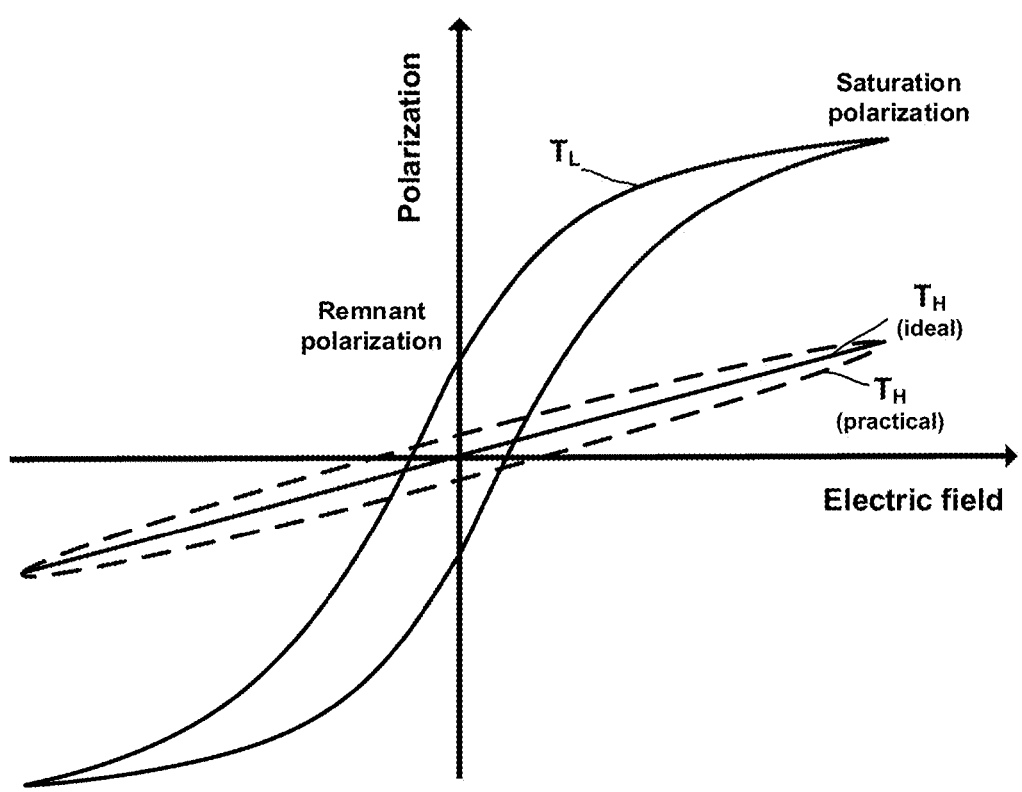
FIG. 3 shows polarization-electric field curves of a phase-transforming ferroelectric material at a low temperature $T_L$ and a high temperature $T_H$ according to certain embodiments, where $T_L$ and $T_H$ have a relation of $T_H > T_c > T_L$, in which $T_c$ is a transformation temperature of the phase-transforming ferroelectric material.

FIG. 3 shows a polarization-electric field relation of a phase-transforming ferroelectric material according to certain embodiments. The phase-transforming ferroelectric material at a low temperature $T_L$ exhibits a hysteresis loop, which shows saturation polarization at the maximum electric field and remnant polarization at zero field. When the temperature increases from $T_L$ to $T_H$ through the transformation temperature $T_c$, the phase-transforming ferroelectric material undergoes phase transformation. The phase-transforming ferroelectric material changes from a ferroelectric phase to either a paraelectric or near-paraelectric phase. In the paraelectric and near-paraelectric phase, the phase-transforming ferroelectric material loses the behavior of hysteresis loop in the polarization-field relation, which tends to be an ideal straight line. While in most of the phase-transforming ferroelectric materials, the polarization-electric field relation is not a perfect straight line due to the existence of leakage current. Thus, it may show a narrow ellipsoidal circle. The ideal relation is indicated by a solid line and the practical relation is plotted in a dashed line.

Figure 4:
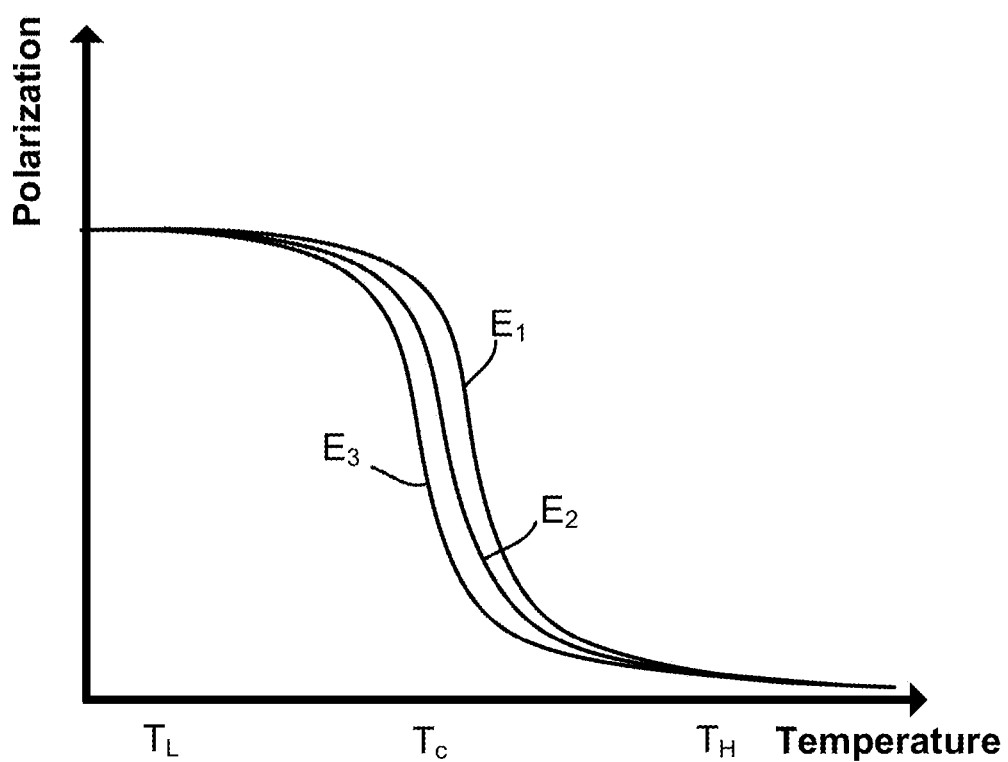
FIG. 4 shows polarization-temperature curves of the phase-transforming ferroelectric material undergoing phase transformation at different electric fields.

FIG. 4 shows a polarization-temperature relation of the phase-transforming ferroelectric material. Under various electric fields, e.g., $E_1$, $E_2$ and $E_3$ ($E_1 > E_2 > E_3$), the ferroelectric polarization changes from a high value to a low value when the temperature changes from $T_L$ to $T_H$. $T_c$ is the phase transformation temperature with the relation of $T_L < T_c < T_H$. The values of polarization under various electric fields in low temperature and high temperature may not be the same in practical measurements.

With the above polarization-temperature and polarization-electric field behavior in the phase-transforming ferroelectric material, the charge-voltage relation and charge-temperature relation in a phase-changing capacitor made of the phase-transforming ferroelectric material are similar to FIG. 3 and FIG. 4, respectively. At a low temperature condition, the phase-changing capacitor has a hysteresis loop in its capacitance-voltage curve, while at a high temperature condition, the hysteresis loop tends to be a straight line. In the charge-temperature relation, the capacitance of phase-changing capacitor changes from a high value to a low value when the temperature increases, and vice versa. The same trend exhibits under various voltages and electric fields.

For the polarization behavior in phase-transforming ferroelectric materials, this change is reversible and the behavior in materials and capacitors in starting status is same as the ending status. The reversible process ensures the stability in continuous energy conversion that converts the fixed amount of heat to electricity under cyclic thermal conditions.

Figure 5:
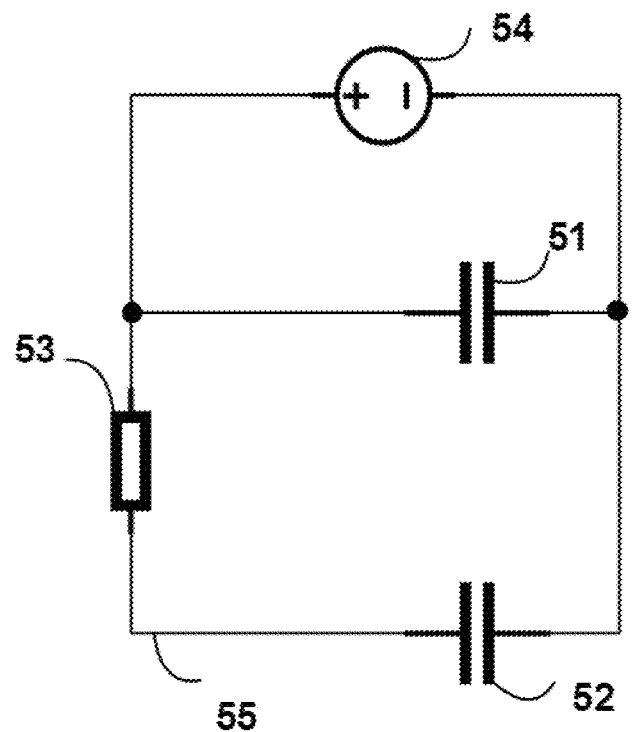
FIG. 5 depicts an energy conversion system in an initialization mode according to certain embodiments.

To utilize the above temperature-dependent material behavior for energy conversion, an electrical circuit of the energy conversion system is provided according to certain embodiments. FIG. 5 shows the electrical circuit of the energy conversion system in an initialization mode. The electrical circuit has a phase-changing capacitor 51 made by a phase-transforming ferroelectric material and a reference capacitor 52. A load resistor 53 is connected between the phase-changing capacitor 51 and the reference capacitor 52 by a network 55. The initialization is achieved by an external DC voltage source 54 connecting to the network 55 such that an initial voltage is established in the phase-changing capacitor 51 and the reference capacitor 52 respectively.

In certain embodiments, other charge filling methods, e.g., inductive charging and wireless charging, are acceptable for the initialization.

Figure 6:
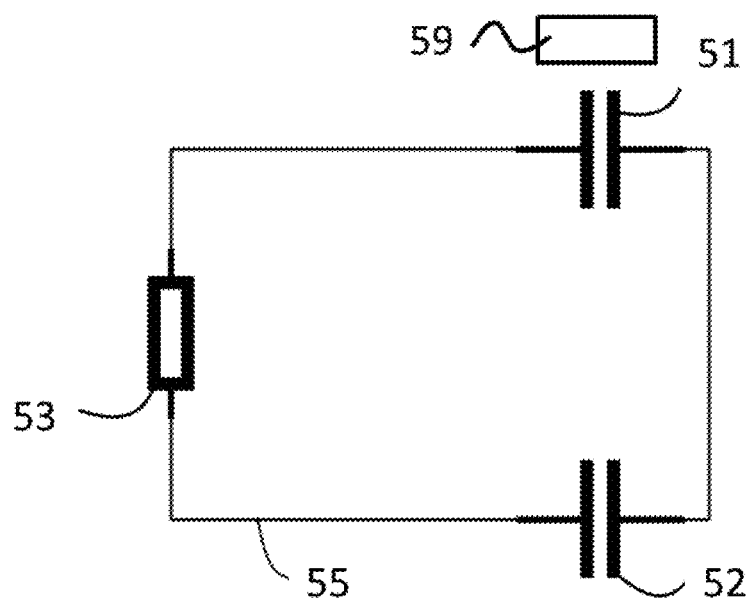
FIG. 6 depicts the energy conversion system in an energy conversion mode.

When the initialization of the system is completed, the external voltage source 54 is removed. Then, the energy conversion system in the energy conversion mode becomes the electrical circuit as shown in FIG. 6. A heat source 59 is placed close to the phase-changing capacitor 51 for applying thermal cycles to the phase-changing capacitor 51 such that a current flow to and fro the phase-changing capacitor 51 and the reference capacitor 52 via the load resistor 53 for converting heat from the heat source 59 into electrical energy to drive the load resistor 53.

Figure 7:
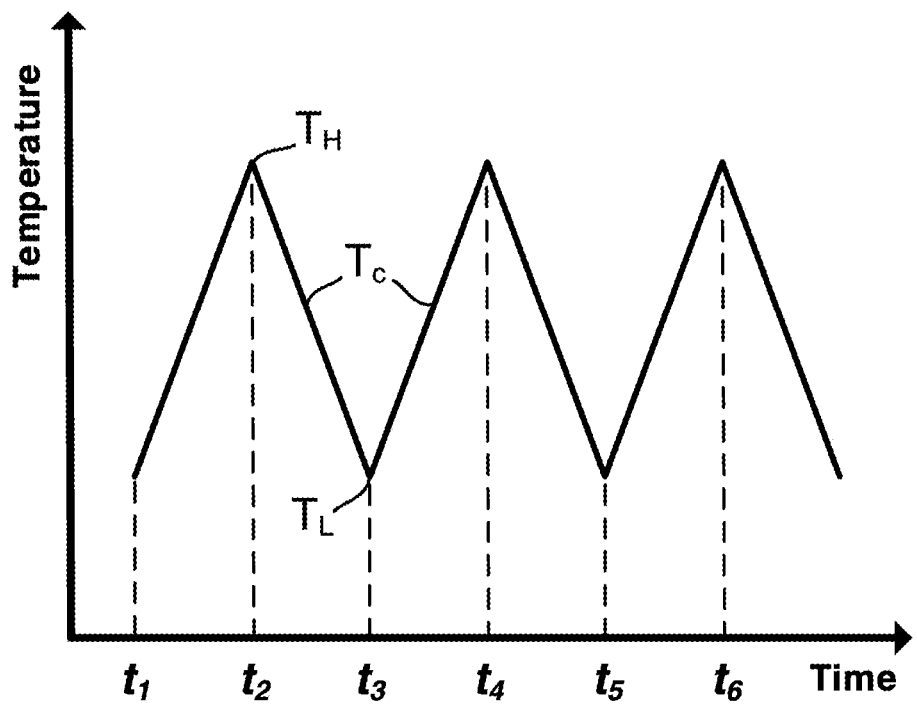
FIG. 7 depicts a temperature profile of the phase-transforming ferroelectric material that periodically oscillates between $T_L$ and $T_H$, where an upper and a lower temperature bounds are selected to cover the whole phase transformation in each cycle.
Figure 8:
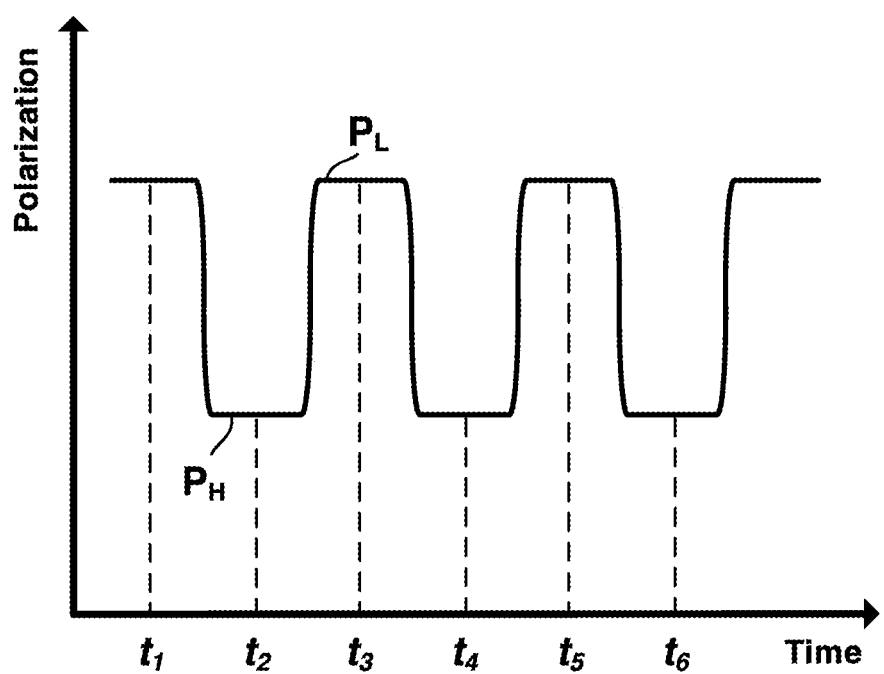
FIG. 8 depicts a periodical change of polarization behavior in the phase-transforming ferroelectric material, where the time dependent temperature is pre-defined in FIG. 7.
Figure 9:
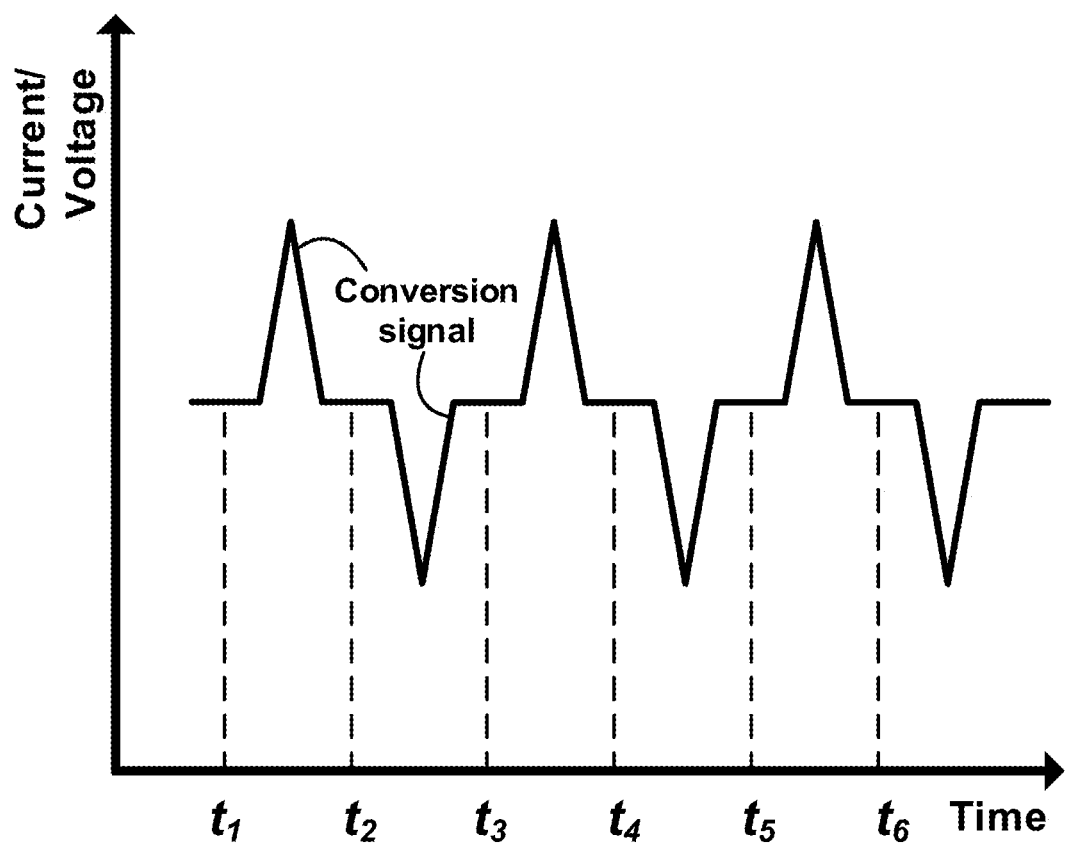
FIG. 9 depicts an energy conversion signal when the energy conversion system converts heat into electrical energy.

To achieve energy conversion, a temperature profile is applied on the phase-transforming ferroelectric material of the phase-changing capacitor 51 as shown in FIG. 7, which oscillates between $T_L$ and $T_H$ across its phase transformation temperature $T_c$. At time $t_1$, the temperature is $T_L$, and at time $t_2$, the temperature is $T_H$. From $t_1$ to $t_3$, it is a loading cycle and FIG. 7 shows three of the loading cycles. Practically, a stable and periodic temperature profile is not easy to obtain, so that additional temperature-oscillating components can be added to generate temperature fluctuation with a steady temperature gradient. For example, the phase-changing capacitor can be placed into rotating blades, thus, the phase-transforming ferroelectric materials undergo oscillated temperature conditions. Under such temperature profile, the polarization in the phase-changing capacitor 51 will also periodically change with the temperature. In FIG. 8, the polarization is $P_L$ at time $t_1$ while the polarization is $P_H$ at time $t_2$. The polarization changes from $P_L$ to $P_H$ when the temperature changes from $t_1$ to $t_2$. For the phase-changing capacitor 51, the capacitance also exhibits same behavior with time. As a result, on the load resistor 53, a current signal is generated with time, which is shown in FIG. 9. From $t_1$ to $t_3$, two electrical signals are generated. The shape of the electrical signal may not be a perfect triangle in practical application, especially for multi-combinations of phase-changing capacitors. The electrical signals under heating and cooling conditions are in opposite directions, which correspond to the reversible phase transformation in phase-transforming ferroelectric materials.

Figure 10:
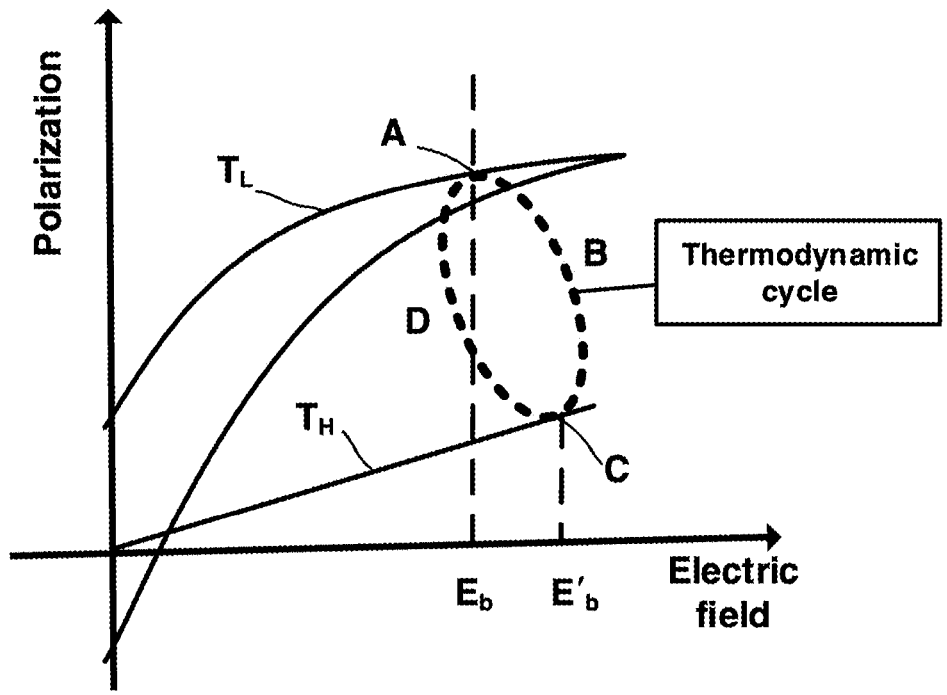
FIG. 10 depicts a thermodynamic cycle on a plane of the polarization-electric field relation in the phase-transforming ferroelectric material.
Figure 11:
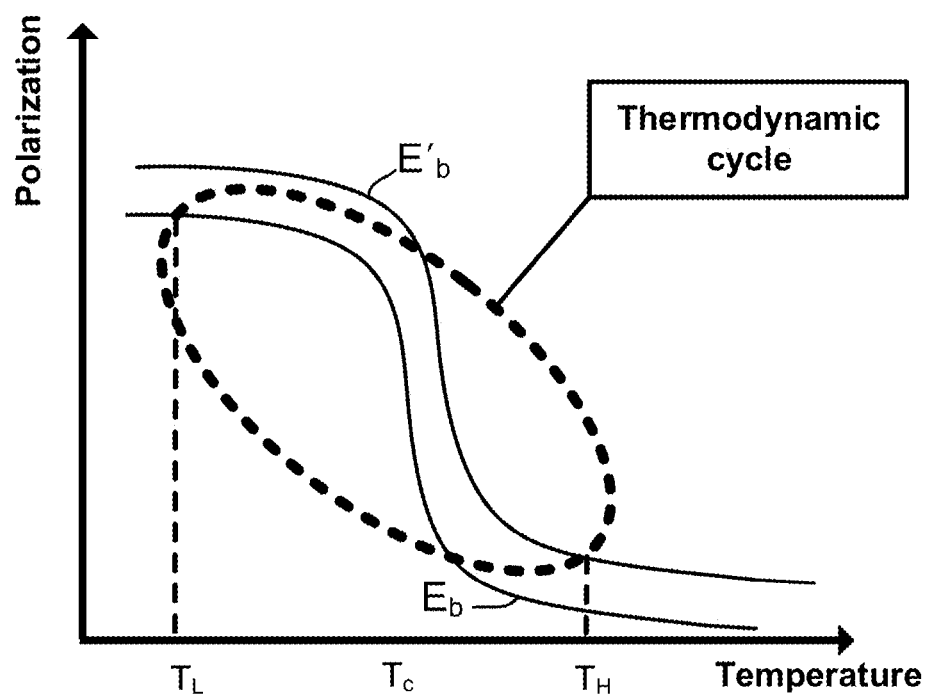
FIG. 11 depicts a thermodynamic cycle on a plane of the polarization-temperature relation in the phase-transforming ferroelectric material.

The thermodynamic process can be illustrated from a plane of the polarization-electric field relation as shown in FIG. 10. Initially, the electric field on the phase-changing capacitor is $E_b$ by initialization process. After the detachment of external power source, the total charge in the electrical circuit is a constant. In a low temperature $T_L$, the polarization starts from point A. When the temperature is changed from $T_L$ to $T_H$, the polarization in the phase-transforming ferroelectric material decreases and the capacitance in the phase-changing capacitor also decreases. Under the definition of capacitance $C = Q/V$, in which Q and V is the charge and voltage in a capacitor respectively. Thus, the voltage in the phase-changing capacitor increases and the electric field across the phase-transforming ferroelectric material also increases, which corresponds to point B. After the full phase transformation of the phase-transforming ferroelectric material, the temperature goes to $T_H$ and the phase-transforming ferroelectric material has the polarization at electric field $E'_b$, which is point C. Point C is the ending point for the heating process. When the temperature decreases from $T_H$ to $T_L$, a return path forms as C-D-A. As a result, a full thermodynamic cycle is A-B-C-D in the plane of the polarization-electric field relation, which is plotted as the dashed circle. Similarly, the thermodynamic cycle in the plane of the polarization-temperature relation is shown in FIG. 11.

Figure 12:
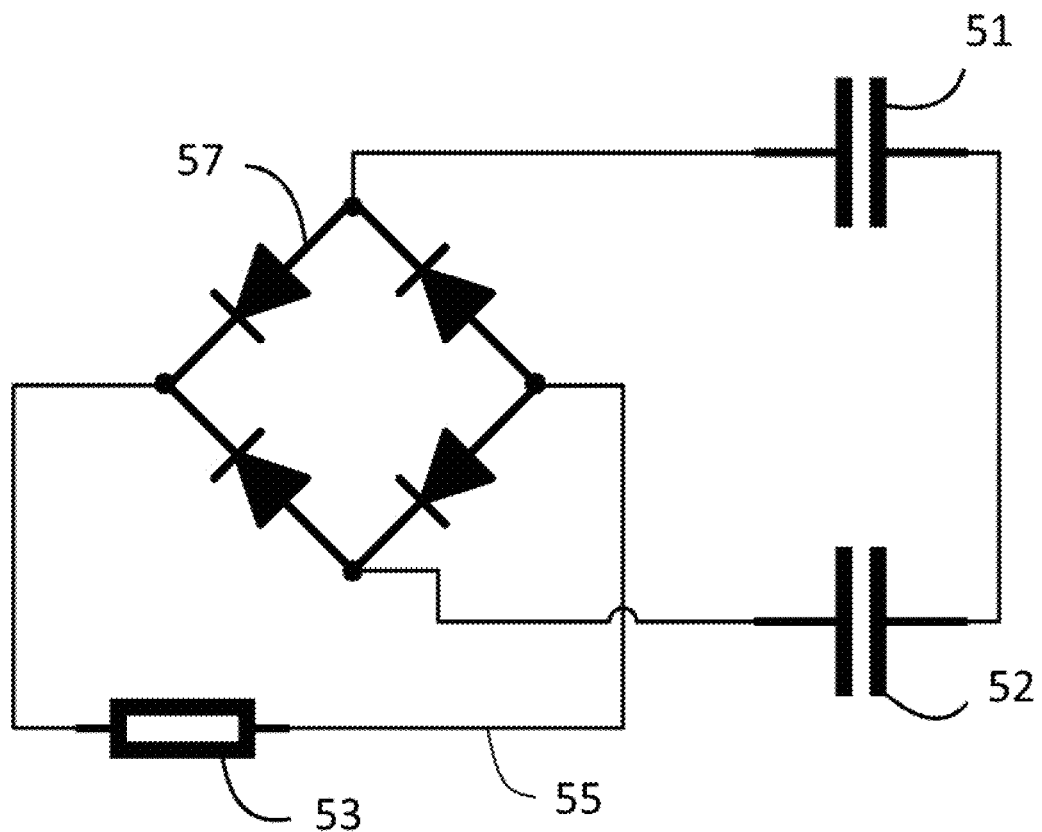
FIG. 12 depicts an external power source free energy conversion system including a rectifier according to certain embodiments.
Figure 13:
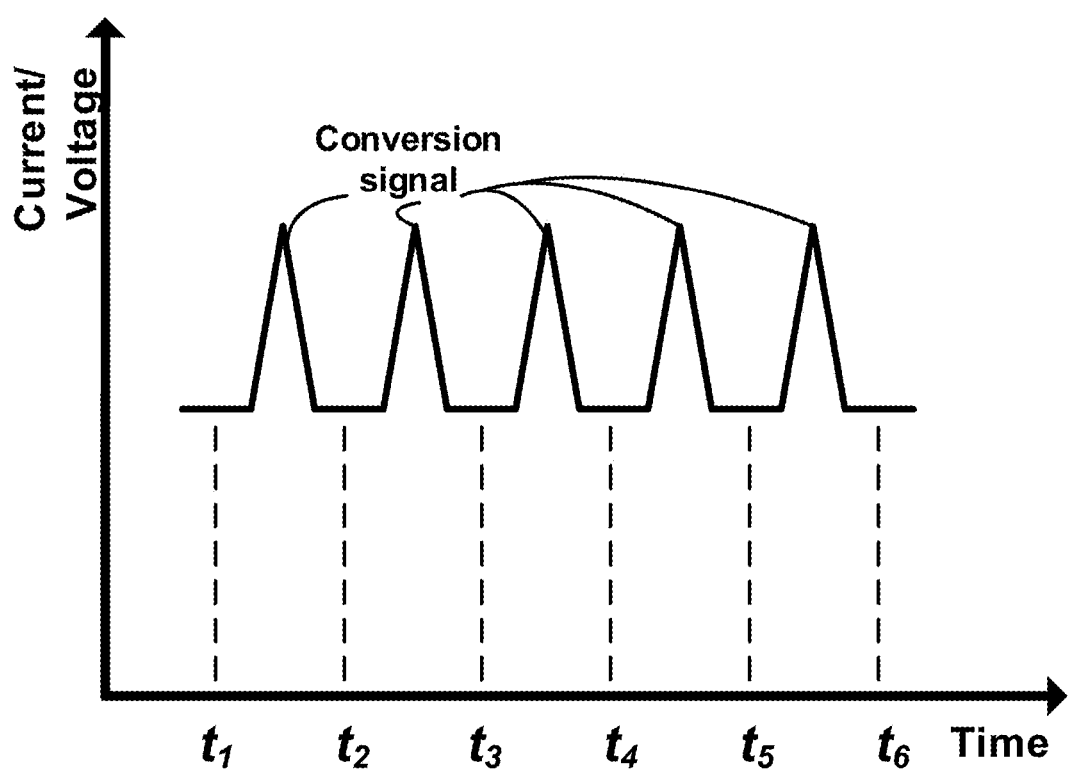
FIG. 13 depicts an energy conversion signal in an external power source free energy conversion system with a rectifier according to certain embodiments.

The electrical circuit in FIG. 6 generates an AC signal in continuous energy conversion cycles. The AC signal can be converted into the DC signal by applying a rectifier 57 to the electrical circuit as shown in FIG. 12. As a result, the energy conversion signal is in the same direction, which is plotted in FIG. 13. Thus, either an AC or a DC signal can be generated according to applications.

The amount of electricity generation for the present energy conversion system is governed by the Figure of Merit (FoM). The FoM includes a material factor and a system factor. For the material factor, among many ferroelectric materials, calcium, cerium and zirconium doped barium titanate can generate high electrical output. The system factor consists of the effective area, thickness of the ferroelectric material in phase-changing capacitor, resistance of load resistor. The electricity generation is proportional to effective area of phase-changing capacitor, resistance of load resistor and is inversely proportional to thickness of phase-changing capacitor.

Figure 14:
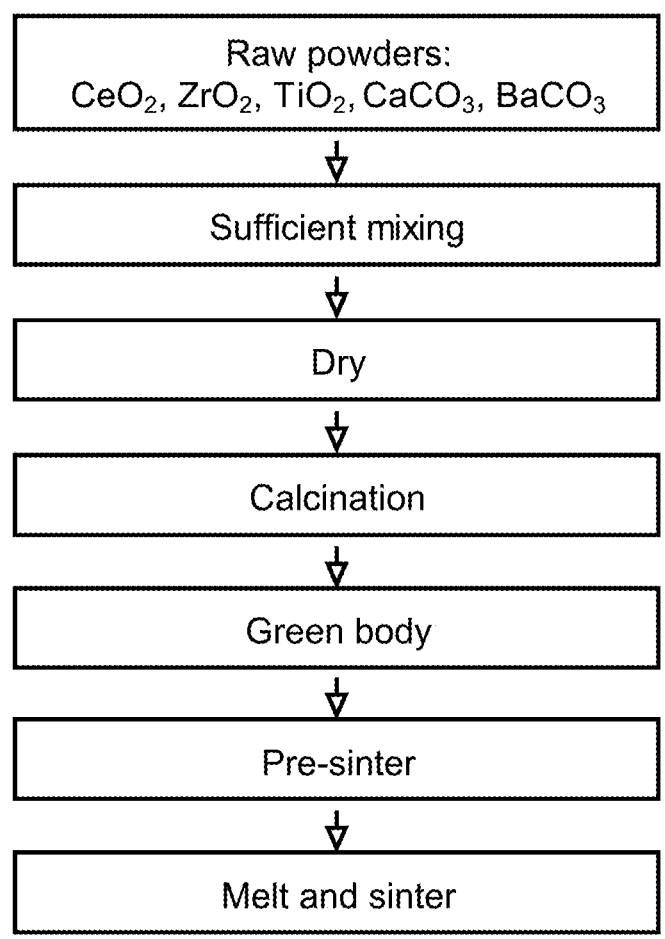
FIG. 14 depicts a synthesis method for synthesizing calcium, cerium and zirconium doped barium titanate according to certain embodiments.

Synthetic procedures for preparing various ferroelectric materials are described in FIG. 14 according to certain embodiments. First, the $CaCO_3$, $CeO_2$, $ZrO_2$, $BaCO_3$ and $TiO_2$ powders are weighed according to their target stoichiometric ratio. After sufficient ball milling, the powders are dried and put into a high temperature furnace for calcination. The calcinated powders are pressed into long and straight green body rods. One rod is placed into infra-red furnace as an upper rod while the other one is served as a lower rod. Two rods are aligned vertically. By well-tuning the power of the infra-red furnace, the temperature on the two rods can be in the range of sintering temperature. Suitable moving speed of both rods is applied. At the same time, two rods are rotated for homogenous heating. Green body rods start to sinter until the end of the rod. Then, the two rods are vertically aligned again and by well-tuning the power of the infra-red furnace, the two rods are melted and rotated to form a stable zone. By simultaneously moving the two rods, the zone starts to expand and high FoM materials are obtained. The FoM in material factors for ferroelectric materials are listed in Table 1. Comparing with the polycrystalline barium titanate, the doped barium titanate has higher FoM.

TABLE 1

| Material | FoM (Material factor) ($\mu C^2$/J cm K) |
|---|---|
| Polycrystalline $BaTiO_3$ | 0.4 |
| $Ca_{0.05}Ba_{0.95}Ce_{0.005}Zr_{0.01}Ti_{0.985}O_3$ | 6.0 |

Figure 15:
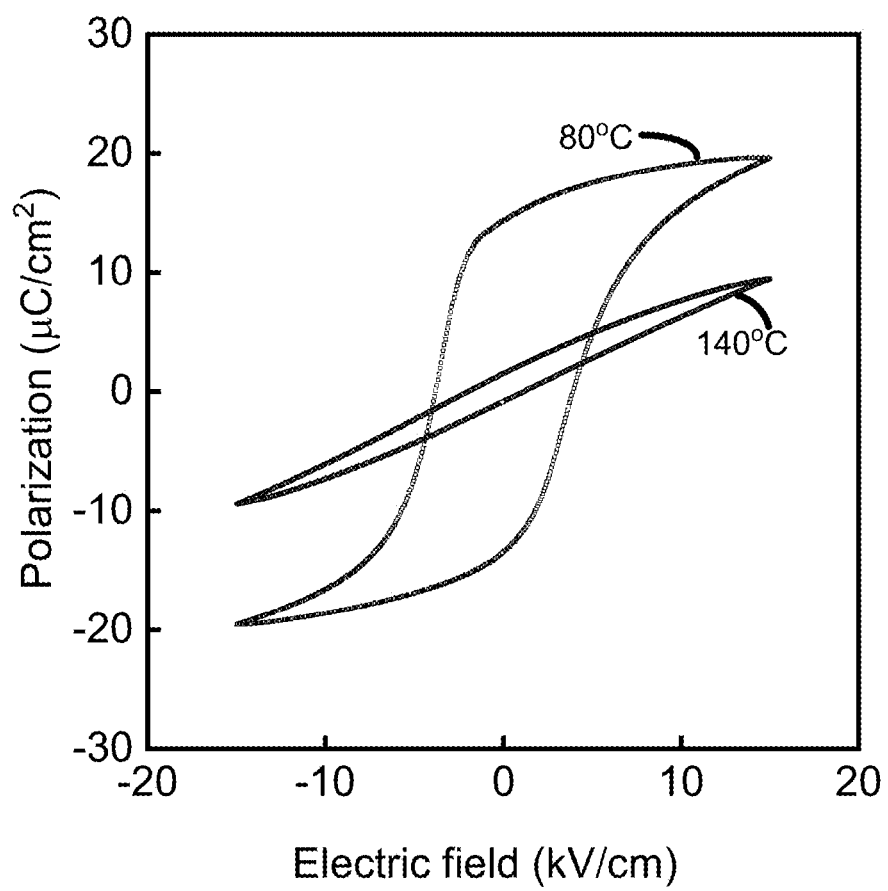
FIG. 15 depicts polarization-electric field behavior of a phase-transforming ferroelectric material of calcium, cerium and zirconium doped barium titanate at different temperatures according to certain embodiments.

The polarization-electric field relation for the ferroelectric material having the composition of $Ca_{0.05}Ba_{0.95}Ce_{0.005}Zr_{0.01}Ti_{0.985}O_3$ is shown in FIG. 15. The polarization-electric field relation at 80° C. shows that the maximum polarization is over 20 $\mu C/cm^2$ and the remnant polarization is over 14 $\mu C/cm^2$. When the temperature increases to 140° C., the polarization-electric field tends to be a line.

Figure 16:
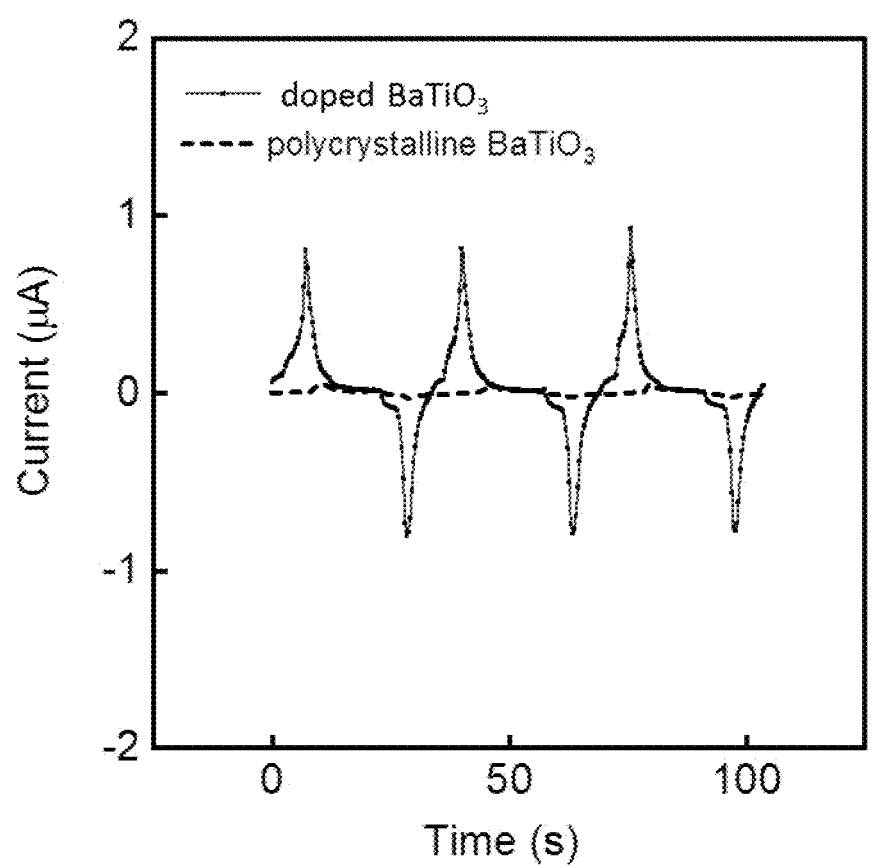
FIG. 16 depicts electricity converted from heat by the phase-transforming ferroelectric material of calcium, cerium and zirconium doped barium titanate.

FIG. 16 shows the electricity generation with the ferroelectric material having the composition of $Ca_{0.05}Ba_{0.95}Ce_{0.005}Zr_{0.01}Ti_{0.985}O_3$. This ferroelectric material was used to form a phase-changing capacitor having an effective area of 90 $mm^2$ and a thickness of 0.3 mm. In this test, the reference capacitor had a capacitance of 50 μF and the load resistor had a resistance of 1000 kΩ. The system was initialized by a 30V DC power source. After that, the power source was removed from the system. Then, a temperature profile cycling between 80° C. and 140° C. was applied to the phase-changing capacitor. The frequency of each cycle including heating and cooling was 0.05 Hz. The electricity measured on the load resistor is shown in FIG. 16. Under temperature profile cycles from 80° C. to 140° C., the ferroelectric material with the highest FoM composition via the present system generates a current of about 1 μA, which is the highest result among the ferroelectric materials in Table 1. A control experiment for electricity generation was conducted with the polycrystalline $BaTiO_3$. As shown in FIG. 16, the phase-changing capacitor formed of the polycrystalline $BaTiO_3$ merely generates about 0.05 μA.

Figure 17:
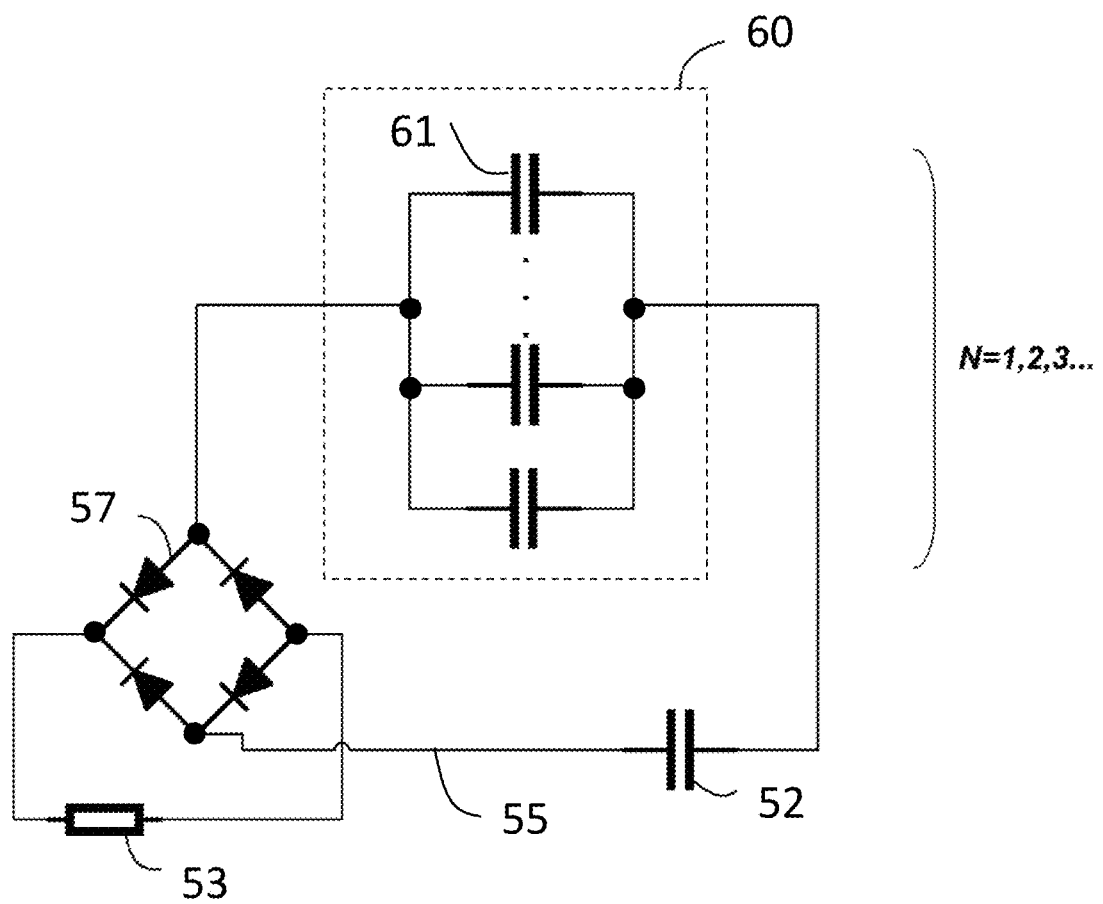
FIG. 17 depicts a parallel-connected phase-changing capacitor set in an external power source free energy conversion system according to certain embodiments.

Moreover, large electricity generation can be achieved by assemblies of multiple phase-changing capacitors. For example, FIG. 17 shows an external power source energy conversion system with a parallel-connected phase-changing capacitor set 60. The set 60 includes N phase-changing capacitors 61, where the N can be varied from 2 to 100.

Figure 18:
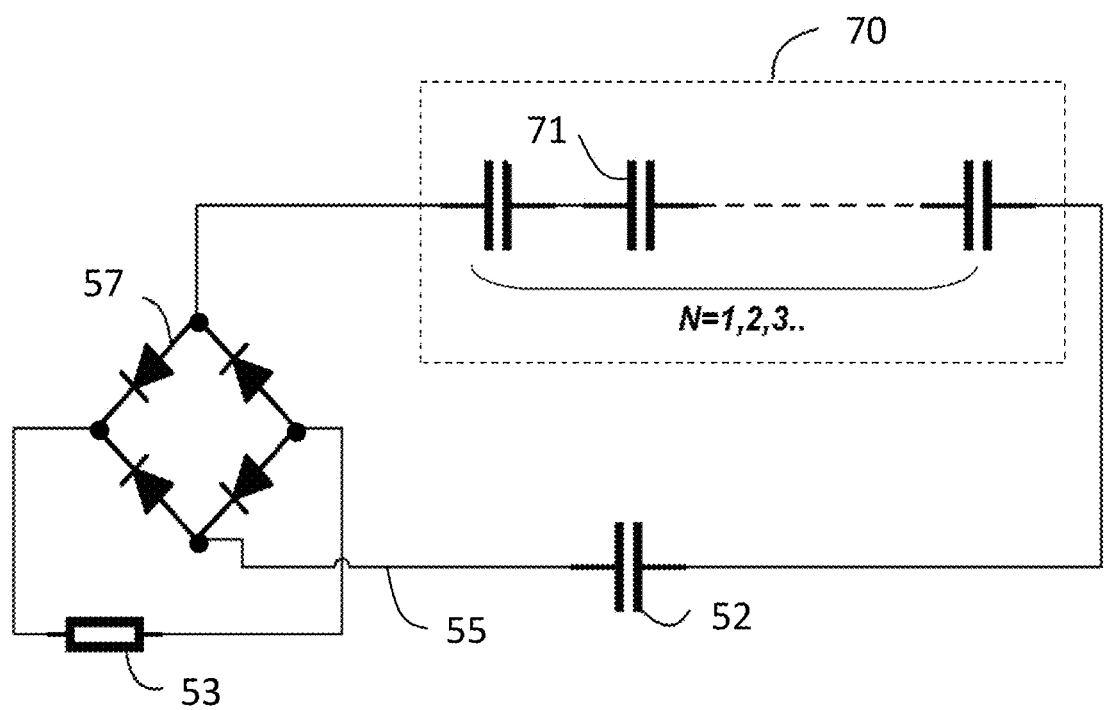
FIG. 18 depicts a series-connected phase-changing capacitor set in an external power source free energy conversion system according to certain embodiments.

FIG. 18 shows an external power source free energy conversion system with the series-connected phase-changing capacitor set 70 including N phase-changing capacitors 71, where the N can be varied from 2 to 100. Specific systems of multiple assemblies can be designed depending on the expected applications.

Accordingly, this energy conversion method is based on utilizing thermodynamic cycles. This is achieved by the self-generated backfield on loading devices. The backfield can generate the field difference on the ferroelectric material and phase-changing capacitor between $T_L$ and $T_H$ condition, which forms a closed-loop in thermodynamic plane. Combining the polarization-electric field and polarization-temperature behavior, a full thermodynamic cycle is formed.

Thus, it can be seen that an improved energy conversion system and method for converting heat into electrical energy have been disclosed which eliminates or at least diminishes the disadvantages and problems associated with prior art systems and methods. Without connecting to any external power sources, the present energy conversion system can generate electricity in any places after initialization. This energy conversion system can continuously generate electricity for a very long time. In addition, the amount of electricity generation can also be improved by doping calcium, cerium and zirconium into barium titanate. The calcium, cerium and zirconium doped barium titanate described above generates promising electricity, which is higher than the reported results (e.g., 250 pA by pyroelectric ZnO nanowire arrays, 30~40 nA by PMN-0.32PT thin film) by traditional pyroelectric energy conversions.

Although the invention has been described in terms of certain embodiments, other embodiments apparent to those of ordinary skill in the art are also within the scope of this invention. Accordingly, the scope of the invention is intended to be defined only by the claims which follow.

What is claimed is:

1. A system for converting heat into electrical energy, the system having an initialization mode and an energy conversion mode and comprising an electrical circuit, the electrical circuit comprising:

a phase-changing capacitor having one or more dielectric layers, each dielectric layer comprising a phase-transforming ferroelectric material such that each phase-changing capacitor has a temperature-dependent capacitance switching from a first capacitance value to a second capacitance value when a temperature of the phase-changing capacitor switches from a first temperature below a phase-transforming temperature of the phase-transforming ferroelectric material to a second temperature above the phase-transforming temperature and vice versa;

a charge reservoir for releasing and receiving charge; and a switching network configured to:

when the system is in the initialization mode, connect an external power source to the electrical circuit for initializing the phase-changing capacitor and the charge reservoir to store charge; and when the system is in the energy conversion mode after the phase-changing capacitor and the charge reservoir are initialized and the external power source is disconnected from the electric circuit, connect a load between the phase-changing capacitor and the charge reservoir such that when the phase-changing capacitor is subjected to one or more thermal cycles and the temperature of the phase-changing capacitor oscillates between the first temperature and the second temperature, a current flows to and fro between the phase-changing capacitor and the charge reservoir through the load, thereby converting heat from the one or more thermal cycles into electrical energy to drive the load.

2. The system of claim 1 further comprising the external power source for initializing the phase-changing capacitor and the charge reservoir when the system is in the initialization mode.

3. The system of claim 1 further comprising the load connecting to the electrical circuit when the system is in the energy conversion mode.

4. The system of claim 1 further comprising a temperature-varying device for assisting in generation of the one or more thermal cycles.

5. The system of claim 1, wherein the phase-transforming ferroelectric material has a ferroelectric phase and a paraelectric phase, the ferroelectric phase providing the first capacitance value, the paraelectric phase providing the second capacitance value.

6. The system of claim 1, wherein the first capacitance value is higher than the second capacitance value, the first capacitance value being between 1 nF and 1 F, the second capacitance value being between 0.1 pF and 1 mF.

7. The system of claim 1, wherein the phase transformation temperature is between 0° C. and 250° C.

8. The system of claim 1, wherein the phase-transforming ferroelectric material is barium titanate, lead zirconate titanate, or polyvinylidene fluoride.

9. The system of claim 1, wherein the phase-transforming ferroelectric material is a doped barium titanate having a chemical formula of $Ca_vBa_wCe_xZr_yTi_zO_3$, where v is between 0 and 0.5, w is between 0.5 and 1, x is between 0 and 0.25, y is between 0 and 0.25, and z is between 0.5 and 1.

10. The system of claim 1, wherein the phase-changing capacitor is formed by connecting plural component phase-changing capacitors in parallel, the one or more dielectric layers being distributed in the component phase-changing capacitors.

11. The system of claim 1, wherein the phase-changing capacitor is formed by connecting plural component phase-changing capacitors in series, the one or more dielectric layers being distributed in the component phase-changing capacitors.

12. The system of claim 1, wherein the charge reservoir is a reference capacitor or a Leyden jar.

13. The system of claim 1, wherein the reference capacitor has a reference capacitance value between 1 nF and 1 F.

14. The system of claim 1, wherein the switching network further comprises one or more switches configured to: connect the external power source to the electrical circuit when the system is in the initialization mode; and connect the load to the electrical circuit when the system is in the energy conversion mode.

15. The system of claim 1, wherein the electrical circuit further comprises a rectifier connecting to the phase-changing capacitor and the charge reservoir through the switching network for rectifying the current from an alternating current signal to a direct current signal.

16. A method for converting heat into electrical energy comprising:
providing the system of claim 1, the system being in the energy conversion mode such that the phase-changing capacitor and the charge reservoir are initialized and the load being connected to the electric circuit; and
subjecting the phase-changing capacitor to one or more thermal cycles such that when the temperature of the phase-changing capacitor oscillates between the first temperature and the second temperature, the current flows to and fro between the phase-changing capacitor and the charge reservoir through the load, thereby converting heat from the one or more thermal cycles into electrical energy to drive the load.

17. The method of claim 16, wherein the phase-changing capacitor and the charge reservoir are initialized by steps of:
connecting the external power source to the electrical circuit when the system is in the initialization mode;
initializing the phase-changing capacitor and the charge reservoir to store charge; and
disconnecting the external power source from the electrical circuit thereby providing the system in the energy conversion mode.

18. The method of claim 17, wherein each of the one or more thermal cycles has a frequency between 0.001 Hz to 1000 Hz.

19. A system for converting heat into electrical energy, the system comprising an electrical circuit, the electrical circuit comprising:
a phase-changing capacitor having one or more dielectric layers, each dielectric layer comprising a phase-transforming ferroelectric material such that each phase-changing capacitor has a temperature-dependent capacitance switching from a first capacitance value to a second capacitance value when a temperature of the phase-changing capacitor switches from a first temperature below a phase-transforming temperature of the phase-transforming ferroelectric material to a second temperature above the phase-transforming temperature and vice versa;
a charge reservoir for releasing and receiving charge; and
a network configured to connect a load between the phase-changing capacitor and the charge reservoir such that after the phase-changing capacitor and the charge reservoir are initialized to store charge, and when the phase-changing capacitor is subjected to one or more thermal cycles and the temperature of the phase-changing capacitor oscillates between the first temperature and the second temperature, a current flows to and fro between the phase-changing capacitor and the charge reservoir through the load, thereby converting heat from the one or more thermal cycles into electrical energy to drive the load.

20. The system of claim 19, wherein the phase-changing capacitor and the charge reservoir are initialized by an inductive charging or a wireless charging.

* * * * *